(12) United States Patent
Ng et al.

(10) Patent No.: US 8,036,655 B2
(45) Date of Patent: *Oct. 11, 2011

(54) CLIENTLESS MOBILE SUBSCRIBERS WITH SEAMLESS ROAMING OVER SCALABLE WIDE AREA WIRELESS NETWORKS

(75) Inventors: Kris Ng, Kanata (CA); Tricci So, Kanata (CA); Yusupha Touray, Ottawa (CA); Donald Wade, Kanata (CA); Hamid Mahmood, Kanata (CA); Fayaz Kadri, Kanata (CA)

(73) Assignee: Nortel Networks Limited, Mississauga (CA)

( * ) Notice: Subject to any disclaimer, the term of this patent is extended or adjusted under 35 U.S.C. 154(b) by 0 days.

This patent is subject to a terminal disclaimer.

(21) Appl. No.: 12/785,151

(22) Filed: May 21, 2010

(65) Prior Publication Data
US 2010/0226336 A1 Sep. 9, 2010

Related U.S. Application Data

(63) Continuation of application No. 11/271,632, filed on Nov. 10, 2005, now Pat. No. 7,738,424.

(60) Provisional application No. 60/627,437, filed on Nov. 12, 2004, provisional application No. 60/688,584, filed on Jun. 8, 2005.

(51) Int. Cl.
*H04W 4/00* (2009.01)
(52) U.S. Cl. ............... 455/432.1; 455/452.2; 455/445; 370/389; 370/400; 370/469; 370/525; 370/331; 370/341; 370/367; 370/390; 370/420; 709/217; 709/209; 709/229; 709/202; 709/227; 709/230; 709/204
(58) Field of Classification Search ............ 455/432.1
See application file for complete search history.

(56) References Cited

U.S. PATENT DOCUMENTS

| | | | |
|---|---|---|---|
| 5,666,648 A | 9/1997 | Stuart | |
| 6,272,148 B1 | 8/2001 | Takagi et al. | |
| 6,917,810 B2 | 7/2005 | Julka et al. | |
| 7,260,638 B2 | 8/2007 | Crosbie | |
| 7,363,352 B2 | 4/2008 | Nakatani et al. | |
| 2002/0035699 A1 | 3/2002 | Crosbie | |
| 2002/0101848 A1 | 8/2002 | Lee et al. | |
| 2002/0143993 A1 | 10/2002 | Jung | |
| 2003/0054810 A1 | 3/2003 | Chen et al. | |
| 2003/0104813 A1 | 6/2003 | Julka et al. | |
| 2003/0187926 A1 | 10/2003 | Karjanlahti | |
| 2005/0041598 A1 | 2/2005 | Cho et al. | |
| 2005/0101245 A1 | 5/2005 | Ahmavaara | |
| 2005/0239445 A1 | 10/2005 | Karaoguz et al. | |
| 2006/0025149 A1 | 2/2006 | Karaoguz et al. | |
| 2006/0135166 A1 | 6/2006 | Sylvain | |
| 2006/0153111 A1 | 7/2006 | Roh et al. | |

*Primary Examiner* — Rafael Pérez-Gutiérrez
*Assistant Examiner* — Joseph Arévalo
(74) *Attorney, Agent, or Firm* — Slater & Matsil, L.L.P.

(57) ABSTRACT

System and method for seamless roaming over scalable wide area Wireless LAN networks (WAWLAN) with clientless mobile subscribers. A preferred embodiment comprises a wireless gateway (WG) coupled to one or more access points in a wireless network to form a wireless cluster (WC), a network access gateway (NAG) coupled to a wired network, and a switch coupled to the WG and the NAG. Each wireless cluster is a Wireless LAN Network (WLAN) with homogenous or heterogeneous network architecture. The WG detects mobile nodes in a wireless cluster and tracks mobile node location in the wireless cluster. The NAG is an anchor point for mobile nodes in the WAWLAN and maintains a fixed source of information about each mobile node regardless of their mobility. The switch provides connectivity between the NAG and the WG. Seamless roaming across Wireless LAN network boundary by mobile subscribers without requiring special mobility enabling client software.

20 Claims, 4 Drawing Sheets

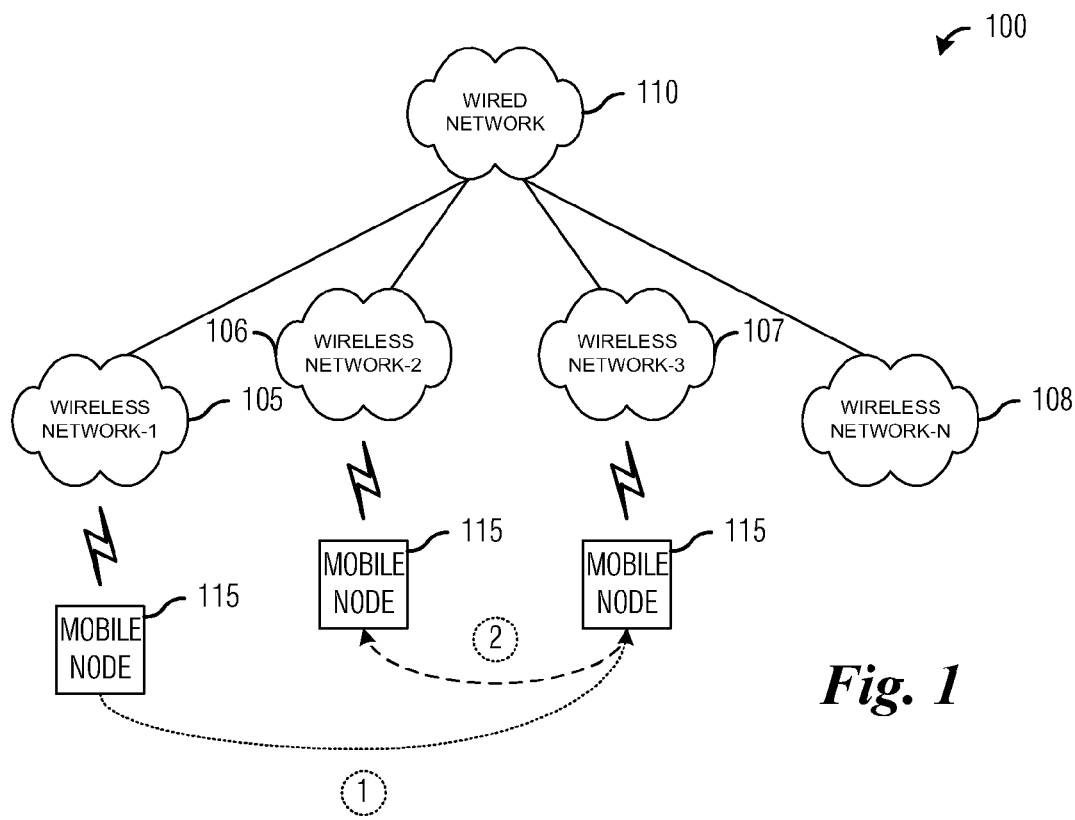
Fig. 1
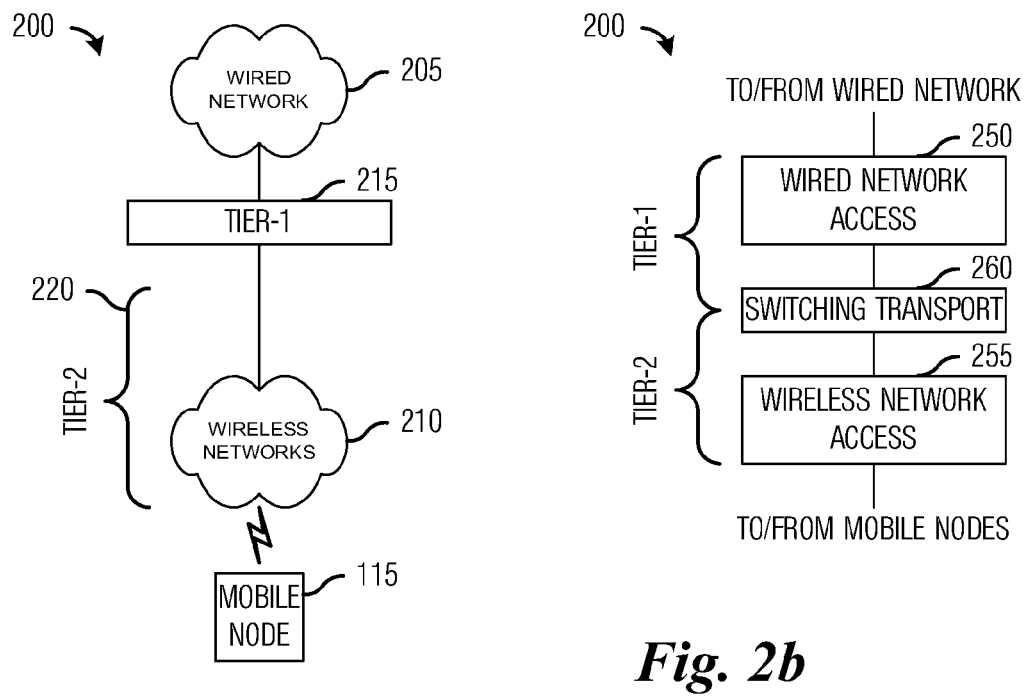
Fig. 2a
Fig. 2b

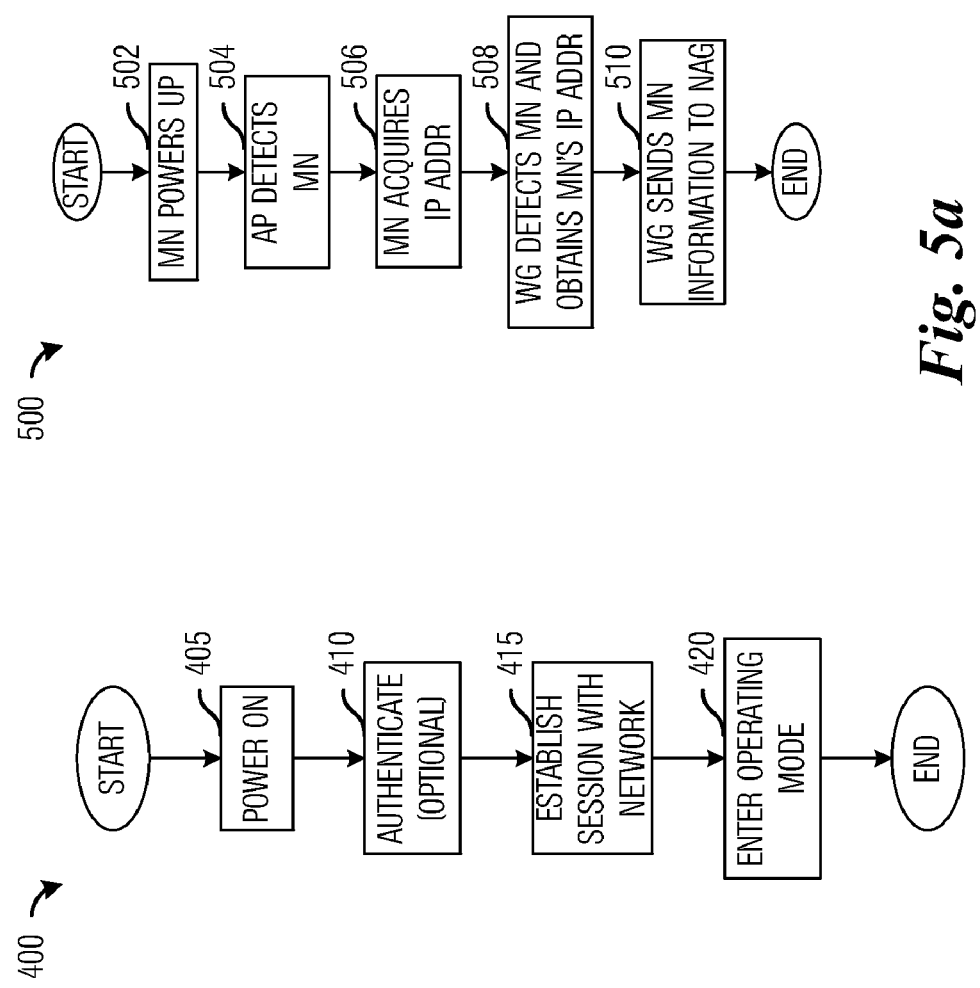
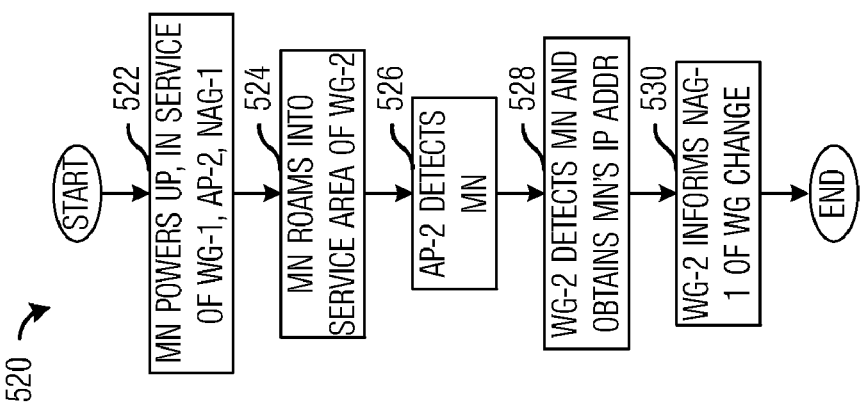

CLIENTLESS MOBILE SUBSCRIBERS WITH SEAMLESS ROAMING OVER SCALABLE WIDE AREA WIRELESS NETWORKS

This application is a continuation of U.S. patent application Ser. No. 11/271,632, entitled "Clientless Mobile Subscribers With Seamless Roaming Over Scalable Wide Area Wireless Networks," filed on Nov. 10, 2005, which claims the benefit of U.S. Provisional Application No. 60/627,437, filed Nov. 12, 2004, entitled "Scalable Clientless Mobile Subscribers Seamless Roaming Over Wide Area Wireless Mesh Network," and Application No. 60/688,584, filed Jun. 8, 2005, entitled "Scalable Clientless Mobile Subscribers Seamless Roaming Over Wide Area Wireless Mesh Network and Wireless LAN Network," which applications are hereby incorporated herein by reference.

TECHNICAL FIELD

The present invention relates generally to a system and a method for digital communications, and more particularly to a system and a method for seamless roaming over scalable wide area Wireless LAN networks (WAWLAN) with clientless mobile subscribers.

BACKGROUND

Wireless LAN (WLAN) networks can provide subscribers with an unprecedented degree of mobility and flexibility. However, a typical Wireless LAN network deployment (such as a hot spot, campus, or enterprise environment) provides limited roaming coverage due to a limited range of WLAN access points. A large scale implementation of a WAWLAN network may also present challenges, including maintaining a mobile subscriber's service and connectivity while the mobile subscriber crosses WLAN network boundaries (roams within the WAWLAN).

Additionally, there exist many implementation options available when using multiple networking architectures in deploying WLANs, such as, control and management intelligence residing in the access point (AP) itself (sometimes referred to as thick AP architecture), control and management intelligence residing in a controller within the WLAN but outside of the APs (sometimes referred to as thin AP architecture), and Wireless Mesh technology. Furthermore, roaming across a wide area network comprising different WLAN architectures presents another challenge in maintaining a mobile subscriber's service and connectivity while crossing WLAN boundaries.

A desire may then exist to create a WAWLAN, comprised of different WLAN architectures, that is capable of providing wireless access to a variety of mobile nodes (subscribers). The ability to permit mobile nodes access to the WAWLAN regardless of how the WLAN networks are implemented can increase the subscriber base, thereby increasing the potential profitability of the WAWLAN operators.

Additionally, to help reduce financial exposure in the deployment of a wireless network, an initial deployment of the WAWLAN may be limited in size and scope with the flexibility to choose the WLAN deployment architecture that is most suitable for supporting an initial customer base. As the number of subscribers increases, the WAWLAN can be expanded to support the increased number of subscribers. The expansion of the WAWLAN may comprise adding additional WLANs of the same networking technology or of a different networking technology.

One solution that can be used to support different networking technologies in a single WAWLAN is to make use of mobility enabling software applications that can be installed in each mobile node. The software applications (commonly referred to as mobility clients) installed in the mobile nodes can permit the mobile node the ability to communicate with the WAWLAN, regardless of what networking technology being implemented in a particular portion of the WAWLAN.

A disadvantage of the prior art that the inclusion of a mobility client in each of the mobile nodes may result in situations wherein a mobile node may not have the proper mobility client installed and may not be able to obtain access to the WAWLAN.

Another disadvantage of the prior art is that the installation of the mobility client application may tax mobile nodes with limited processing power or capability and may preclude their use in the WAWLAN or may limit their performance to a level that is unacceptable.

Yet another disadvantage of the prior art is that the wireless network operator must deploy network elements in the WAWLAN in support of the mobility client to enable mobile subscribers roam across the wide area Wireless LAN network. The additional hardware/software can require a large expenditure in maintenance and support. Furthermore, the lack of scalability of such a solution is not conducive to future expansion of the WAWLAN.

SUMMARY OF THE INVENTION

These and other problems are generally solved or circumvented, and technical advantages are generally achieved, by preferred embodiments of the present invention which provides a system and a method for seamless roaming over scalable wide area Wireless LAN network with clientless mobile subscribers.

In accordance with a preferred embodiment of the present invention, a network is provided. The network includes a wireless gateway coupled to one or more wireless network access points in a wireless network to form a wireless cluster, a network access gateway coupled to a wired network, and a switch coupled to the wireless gateway and the network access gateway. The wireless gateway tracks mobile node location in the wireless cluster, detects the presence of mobile nodes in the wireless cluster, and directs message traffic, while the network access gateway is an anchor point for mobile nodes in the wireless network, maintains a fixed source of information about each mobile node regardless of the mobility of the mobile node, and directs incoming and outgoing traffic to and from the mobile nodes. The switch provides connectivity between the network access gateway and the wireless gateway.

In accordance with another preferred embodiment of the present invention, a method for communicating in a network is provided. The method includes establishing a session for a mobile node in the network and permitting the mobile node to enter an operating mode, wherein information regarding a routing of packet to the mobile node is stored in a fixed location in the network, independent of a location of the mobile node.

An advantage of a preferred embodiment of the present invention is that clientless roaming is provided, which does not require client applications to be loaded into mobile nodes to support roaming within the WAWLAN. Additionally, seamless roaming is supported so that a mobile node can travel within the operating range of the WAWLAN (ranging from hot spot (small scale) to city-wide public access (large scale)) and move across subnets without requiring user intervention.

A further advantage of a preferred embodiment of the present invention is that the WAWLAN is scalable to support large numbers of mobile nodes without significantly increasing the complexity of the wireless WAN by incrementally integrating WLANs of different architectures. This can enable an initial rollout of the WAWLAN with a small operating area and then rapidly and easily increase the capacity of the WAWLAN as subscribers increase.

Yet another advantage of a preferred embodiment of the present invention is that standard, off-the-shelf hardware and software can be used to implement the wireless WAN, further decreasing the cost of implementing the WAWLAN. Furthermore, since the hardware and software are already available, they are well tested and debugged. Therefore, the cost of the WAWLAN can further be reduced since testing and operating support for the WAWLAN need not be extensive as if all new hardware and software were used in the WAWLAN.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which:

FIG. 1 is a diagram of a wide area Wireless LAN network (WAWLAN);

FIGS. 2a through 2c are diagrams of a tiered hierarchy WAWLAN with support for clientless mobile nodes and seamless roaming, according to a preferred embodiment of the present invention;

FIG. 4 is a diagram of a sequence of events describing the operation of a mobile node in the WAWLAN, according to a preferred embodiment of the present invention; and FIGS. 5a through 5d are diagrams of sequences of events describing the operations of the mobile node in the WAWLAN, according to a preferred embodiment of the present invention.

DETAILED DESCRIPTION OF ILLUSTRATIVE EMBODIMENTS

Figure 3:
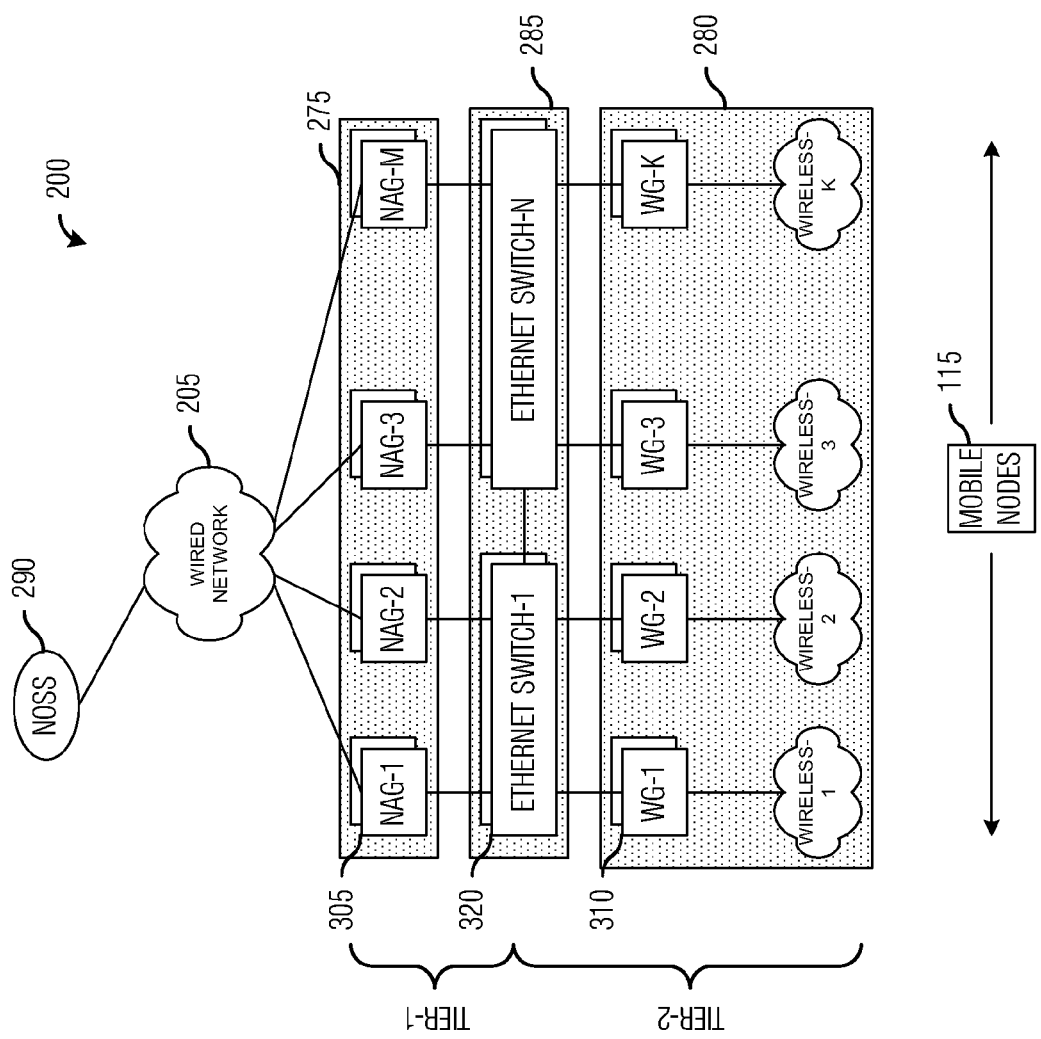
FIG. 3 is a diagram of a detailed view of the tiered hierarchy WAWLAN, according to a preferred embodiment of the present invention.

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to preferred embodiments in a specific context, namely a wide area Wireless LAN network (WAWLAN) comprised of wireless mesh connected networks, and/or wireless local area networks (WLANs) with different networking implementations (including but not limited to: traditional thick AP architecture with control and management intelligence residing in the access point itself, and thin AP architecture with control and management intelligence residing in a controller within the Wireless LAN network but outside of the access points). The invention may also be applied, however, to other instantiations of WAWLANs wherein the encompassing WLAN networks may be homogeneous or heterogeneous.

With reference now to FIG. 1, there is shown a diagram illustrating an exemplary WAWLAN 100. In order to provide a wide coverage area, the WAWLAN 100 can have multiple Wireless LAN networks, such as wireless network-1 105, wireless network-2 106, wireless network-3 107, and wireless network-N 108. Each of the individual WLAN networks may have a unique topology, a common topology, or some combination thereof. For example, the wireless network-1 105 may have a mesh network, while the wireless network-2 106 may have a thick AP architecture wireless local area network (WLAN) topology.

The wireless networks of the WAWLAN 100 can be coupled to a wired network 110. The wired network 110 can provide an infrastructure that can permit the individual wireless networks to communicate with each other as well as provide connectivity to other networks, such as the Internet, corporate networks, private commercial networks, and so forth. Additionally, the wired network 110 can provide connectivity to services such as authentication services, accounting services, authorization services, and so forth.

The WAWLAN 100 can be used to provide connectivity to subscribers through the use of mobile nodes, such as a mobile node 115. A mobile node may be a device that can connect to the WAWLAN 100 and source and/or sink information. For example, a mobile node may be a simple device that only receives information, such as financial, weather, news, and so forth. Alternatively, a mobile node may be a personal computer, Wi-Fi telephone, personal digital assistant, and so on, that can also provide information as well as receive information.

As the subscriber makes use of a mobile node, such as the mobile node 115, the subscriber may move out of an operating range of a first wireless network and into an operating range of a second wireless network. For example, as shown in FIG. 1, the mobile node 115 may initially be communicating with the wireless network-1 105. However, as the subscriber moves around, the mobile node 115 may move out of the operating range of the wireless network-1 105 and into the operating range of the wireless network-3 107 (shown as a dotted link labeled "1"). Then as the subscriber continues to move, the mobile node 115 may move into the operating range of the wireless network-2 106 (shown as a dashed link labeled "2").

In the past, when a mobile node changes from communicating with a first wireless network to a second wireless network, when the two wireless networks are implemented using different networking technologies, the subscriber may experience network connectivity interruption and/or service degradation. Subscriber satisfaction may degrade, especially in fringe areas where the subscriber needs to frequently make changes, while if client applications are needed, then a minimum complexity required for mobile nodes may exceed existing mobile nodes and prevent their use. A need is therefore present for a WAWLAN that can support clientless mobile nodes and seamless roaming.

Figure 2C:
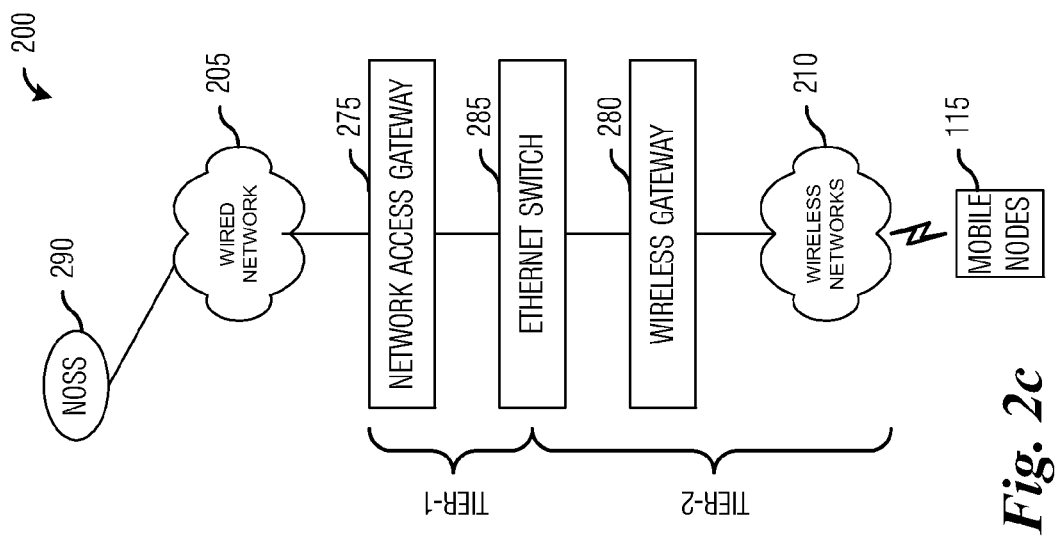

With reference now to FIGS. 2a through 2c, there are shown diagrams illustrating high level views of a WAWLAN 200 that makes use of a tiered hierarchy to provide support for clientless mobile nodes and seamless roaming, according to a preferred embodiment of the present invention. The diagram shown in FIG. 2a illustrates that the WAWLAN 200 includes a wired network 205 and one or more wireless networks 210. The WAWLAN 200 provides access to information and services to subscribers making use of mobile nodes, such as mobile node 115. In order to provide support for clientless mobile nodes and seamless roaming, a two-tiered hierarchy of anchor points overlaying a distributed network is used. A first tier 215, labeled "tier-1," can function as anchor points for subsets of mobile nodes in the WAWLAN 200 and a second tier 220, labeled "tier-2," can function as gateways for mobile node access points (also referred to as wireless access points (WAP) or simply access points (AP)) to create wireless clusters (WC). The first tier 215 can be responsible for macro-mobility that keeps track of which WC with whom each mobile node is currently communicating and the second tier 220 can be responsible for micro-mobility that keeps track of which WAP with whom the mobile node is currently communicating.

The diagram shown in FIG. 2b illustrates a network layer view of the WAWLAN 200. Between the wired network 205 and the wireless networks 210, there may exist a wired network access layer 250 and a wireless network layer 255. The wired network access layer 250 can provide access to and from the wired network 205, while the wireless network access layer 255 can provide access to and from the wireless networks 210 and mobile nodes 115. Coupling the wired network access layer 250 and the wireless network access layer 255 is a switching transport layer 260. The switching transport layer 260 can provide necessary packet switching needed to transmit a packet between the wired network 205 and the wireless networks 210. The wired network access layer 250 and a portion of the switching transport layer 260 make up the first tier 215 of the wireless WAN 200 and the wireless network access layer 255 and a portion of the switching transport layer 260 make up the second tier 220 of the WAWLAN 200.

The diagram shown in FIG. 2c illustrates a functional block view of the WAWLAN 200. The wired network access layer 250 can be functionally implemented as a network access gateway (NAG) 275, which can perform tasks such as being an anchor point for mobile nodes, which can entail maintaining information regarding which wireless network is associated with each mobile node, controlling and directing incoming and outgoing network traffic to and from mobile nodes, subscriber authentication, and so forth. The wireless network access layer 255 can be implemented as a wireless gateway (WG) 280 which can include one or more WLAN access points (not shown). The WG 280 and the WLAN access points can be used to form wireless clusters (WC), and the WG 280 can function as an anchor point to all mobile nodes associated with each WC. Furthermore, the WG 280 can keep track of the location of mobile nodes in the WC and informing the NAG 275 of each mobile node's WC association. The switching transport layer 260 can be implemented using an Ethernet switch 285. A network operation support system (NOSS) 290 can be connected to the wired network 205 to provide needed network management functionality to the WAWLAN 200.

With reference now to FIG. 3, there is shown a diagram illustrating a detailed view of the WAWLAN 200, according to a preferred embodiment of the present invention. In order to support scalability of the WAWLAN 200, the NAG 275, the WG 280, and the Ethernet switch 285 can be implemented using circuitry that can permit the incremental addition of additional similar functioning circuitry to increase the ability of the WAWLAN 200 to support a larger number of mobile nodes 115. For example, the NAG 275 may be implemented with multiple circuits, such as NAG-1 305, that can perform the functions of a NAG for a certain number of mobile nodes. Similarly, Ethernet switch-1 320 and WG-1 310 can provide Ethernet switching and wireless gateway functionality for specified number of mobile nodes. Should there be a desire to increase the number of mobile nodes to be supported by the WAWLAN 200, additional circuitry can be added to the AG 275, the WG 280, and the Ethernet switch 285.

In order to provide support for a two-tiered hierarchy, the WG 280 can be used to provide functionality, including: mobile node location tracking while connected to a WC through an AP, informing a mobile node's anchor, NAG 275, when a mobile node is detected within the WC, informing APs in the WC when a mobile node leaving the WC is detected, maintaining mapping between a mobile node's IP address and the mobile node's anchor NAG (a NAG specifically associated with a mobile node), directing mobile node traffic towards its anchor NAG, and so forth. Mobile node tracking can be performed by the WG 280 via techniques such as by performing a mobile IP (MIP) home agent function, IEEE 802.11f "Inter-Access Point Protocol" L2 update frames, IEEE 802.11 MAC layer primitives, and so on.

To provide reliable performance in the presence of potential failures, the NAG 275, WG 280, and Ethernet switch 285 can be backed up with at least one duplicate circuit that can be automatically switched into service in case of failure. Although shown in FIG. 3 as being a fully redundant system, with a replacement present for each circuit in the NAG 275, WG 280, and Ethernet switch 285, a potentially more efficient fault-tolerant system can be implemented wherein a pool of redundant replacements can be present and then when a failure is detected, a replacement can be switched in.

A mobile node is associated to its anchor NAG by its IP address. For example, an anchor NAG may be responsible for all mobile nodes with an IP address that matches 192.1.X.X and a second anchor NAG is responsible for all mobile nodes with an IP address matching 192.2.X.X. If multiple NAGs are responsible for one set of mobile nodes, for example, for fault tolerance purposes, then only one of the NAGs will function as a primary access NAG and the remainder will be standby units that will take over if the primary access NAG fails.

With reference now to FIG. 4, there is shown a diagram illustrating a sequence of events 400 describing the operation of a mobile node in the WAWLAN 200, according to a preferred embodiment of the present invention. A mobile node, such as the mobile node 115 (FIG. 1), being used by a subscriber, must undergo a series of events before it can begin operating in the WAWLAN 200. The sequence of events 400 describes one such series of operations for a typical mobile node.

The sequence of events 400 can begin with the mobile node 115 being powered on (block 405). As the mobile node 115 is powered on, it undergoes an initialization phase, which can include configuring its radio frequency circuitry, testing various circuits and memories, acquiring a radio frequency signal (such as a beacon or a synchronization signal) to enable it to join the WAWLAN 200, and so forth. Although the mobile node 115 may perform all of these tasks when it is powered on, it may also periodically perform these tasks (with perhaps exception given to the configuration of its radio frequency circuitry and testing of various circuits and memories) when it is powered on but not having been able to join the WAWLAN 200.

After the mobile node 115 has been powered on (block 405) and having been able to join the WAWLAN 200, the mobile node 115 can undergo an optional authentication operation (block 410). The authentication operation is to ensure that the mobile node 115 (and hence its user, the subscriber) has permission to make use of the WAWLAN 200. The authentication may verify the identity of the subscriber, check the status of the subscriber's account, and so forth. The authentication operation is optional since in an open network, it may not be necessary to verify the identity of the mobile node 115. Once authenticated, the mobile node 115 can establish a session with the WAWLAN 200 (block 415). The session established can depending upon the nature of the subscriber's account, the capabilities of the mobile node 115, the capabilities of the wireless network that the mobile node 115 has connected with, and so forth. The establishment of the session can involve the storage of information pertaining to a routing of packets to the mobile node 115 in a fixed location. The storage of the information will be discussed in greater detail below. Once the session has been established, the mobile node 115 can enter an operating mode (block 420), which can include sending and receiving packets, roaming, and so on. If there are changes to mobile node 115, such as when the mobile node 115 roams to a different portion of the WAWLAN 200, then information regarding a routing of packets to the mobile node 115 can be updated.

With reference now to FIG. 5a, there is shown a diagram illustrating a sequence of events 500 in a mobile node 115 powering up and establishing a session with the WAWLAN 200, according to a preferred embodiment of the present invention. According to a preferred embodiment of the present invention, the sequence of events 500 provides a detailed description of events 405 and 415 shown in FIG. 4. The sequence of events 500 can begin with the mobile node 115 powering up within an operating area of the WAWLAN 200 (block 502). As discussed previously, the mobile node 115 may have already been powered on and moved into the operating area of the WAWLAN 200. As the mobile node 115 powers up (or moves into) the operating area of the WAWLAN 200, the mobile node 115 can be detected by an access point (AP), such as AP-1 (not shown), of a wireless cluster (WC), such as WC-1 (not shown) (block 504). Although not shown in FIG. 5a, the mobile node 115 may then undergo an optional authentication process.

The mobile node 115 can then acquire an Internet protocol (IP) address (block 506). The mobile node 115 may acquire the IP address from a server or an application. For example, the mobile node 115 may transmit a configuration request to a dynamic host configuration protocol (DHCP) server (not shown) and the DHCP server can return to the mobile node 115 configuration information, including the IP address. Furthermore, the DHCP server can also provide a vendor specific value to indicate the mobile node's network access gateway (NAG) address. DHCP and DHCP servers are considered to be well understood by those of ordinary skill in the art of the present invention and will not be discussed herein. When the mobile node 115 acquires the IP address, the mobile node 115 will maintain the IP address until its session with the WAWLAN 200 is terminated. The mobile node 115 will maintain the IP address even if it roams out of its current WC into another WC.

After the mobile node 115 acquires the IP address, a wireless gateway (WG), such as the WG-1 310 (FIG. 3), can detect the presence of the mobile node 115 in the WC and obtain the mobile node's IP address (block 508). The WG detects presence of a mobile node within its subtending WC by means of technique specific to the network architecture of the wireless cluster. These techniques (such as MIP registration, IEEE802.11f L2 update, IEEE 802.11 MAC primitives) are considered well understood by those of ordinary skill in the art of the present invention and will not be discussed further herein. For example, one way for the WG to detect the presence of the mobile node 115 and obtain its IP address could be for the AP to send a mobile node registration request to the WG. The mobile node registration request can also be referred to as an MIP (mobile IP) registration request. The mobile node registration request may include a NAG address (which can be the same as the default gateway IP address) and a home-agent address (which may be provided by the DHCP server), for example. The WG can perform processing of the mobile node registration request, which can include: extracting a NAG IP address from the mobile node's registration request; if the NAG (from NAG IP address) is currently offline, then rejecting the registration request; if the NAG is active, then updating information related to the mobile node to include the NAG IP address; if the registration request results in a creation of a binding for a new mobile node, then informing other WGs of new binding.

The WG will create a mobility binding the first time that the mobile node 115 associates with the AP within a given WC. It also informs other WGs of the new binding, as well as the mobile's anchor NAG to indicate to that the mobile node currently roams into the coverage area of the WG. If the mobile node 115 already has a mobility binding, then the mobility binding can be updated. When a mobility binding is updated, the WG will inform the anchor NAG of the mobile node 115 of the update. The WG can make use of a Unicast ARP (address resolution protocol) message to send the updated mobility binding to the anchor NAG, for example.

After detecting the mobile node 115 and obtaining its IP address (block 508), the WG can send the information to a network access gateway (NAG) that is functioning as an anchor NAG for the mobile node 115 (block 510). For example, the WG can send the mobile node's information to the anchor NAG, wherein the anchor NAG is the NAG specified by the NAG IP address from the mobile node's registration request. The WG can make use of a Unicast ARP (address resolution protocol) message to send the mobile node's information to the anchor NAG, for example.

With reference now to FIG. 5b, there is shown a diagram illustrating a sequence of events 520 in a mobile node 115 roaming between two wireless gateways of the WAWLAN 200, according to a preferred embodiment of the present invention. The sequence of events 520 provides a detailed description of events occurring when a mobile node 115 roams from a first WG, such as WG-1, to a second WG, such as WG-2. The sequence of events 520 can begin with the mobile node 115 powering up within the operating area of the WAWLAN 200 (block 522). The sequence of events 500 (FIG. 5a) can be referenced for a description of the power up sequence for a mobile node in the WAWLAN 200. For discussion purposes, let the mobile node 115 be associated with wireless gateway "WG-1," access point "AP-2," and network access gateway "NAG-1."

Sometime during the course of normal operations, the mobile node 115 roams out of the service area of WG "WG-1" and into the service area of another WG, for example, WG-2 (block 524). The AP "AP-2" can then detect the IP address of the mobile node 115 (block 526). Since the mobile node 115 already has an IP address that it maintains for as long as it has a session with the WAWLAN 200, the mobile node 115 does not need to acquire a new IP address. A wireless gateway (WG), such as the WG-2, can detect the presence of the mobile node 115 in the WC and obtain the mobile node's IP address (block 528). The WG "WG-2" can then inform the mobile node's anchor NAG of the change in WG (block 530). For example, the WG "WG-2" can transmit a message to the anchor NAG of the mobile node 115, NAG-1, to inform the NAG "NAG-1" of the change from WG "WG-1" to WG "WG-2" (block 530). The NAG "NAG-1" can update its internal forwarding information to reflect the change from WG "WG-1" to WG "WG-2."

When a mobile node roams from the service area of a first WG into a service area of a second WG, the first WG can delete information that it may have regarding the mobile node. There can be several ways to detect when to delete the information. A timer can be used to determine when to delete the information. For example, a timer can be associated with each mobile node entry in a WG. The timer can be reset each time that there is an access to the information about the mobile node. Therefore, if a mobile node's timer is permitted to expire, then the information for the mobile node has not been accessed for an extended amount of time and can be deleted. The value of the timer can be determined through subscriber authentication process and/or pre-configured operational parameters on the WG. Alternatively, when the mobile node roams into the operating area of the second WG and the events described in the sequence of events 520 have successfully completed, the second WG can transmit a message to the first WG to inform the first WG to delete the information that it may have stored regarding the mobile node.

Figure 5C:
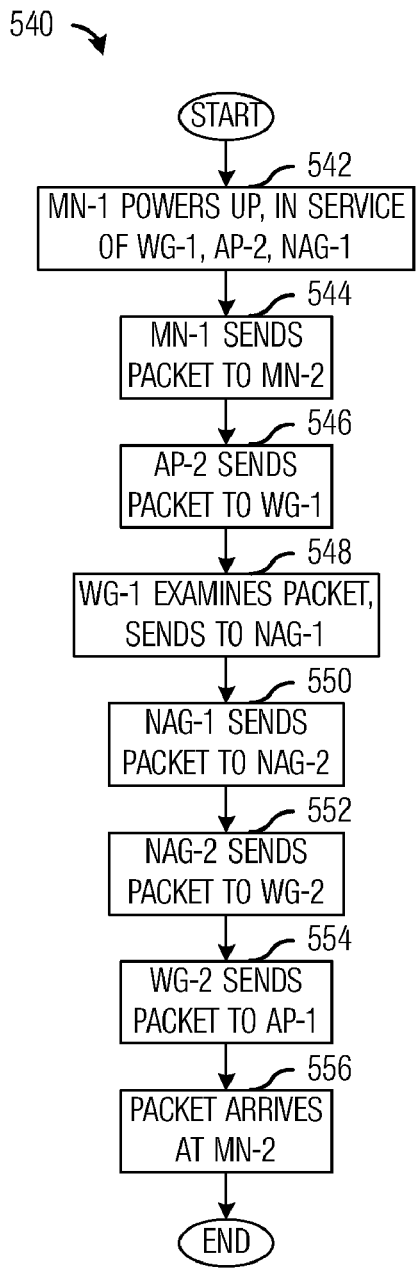

With reference now to FIG. 5c, there is shown a diagram illustrating a sequence of events 540 in a transmittal of a packet from a first mobile node (MN-1) to a second mobile node (MN-2), according to a preferred embodiment of the present invention. For discussion purposes, let the first mobile node be associated with wireless gateway "WG-1," access point "AP-2," and network access gateway "NAG-1." Furthermore, let the second mobile node be associated with wireless gateway "WG-2," access point "AP-1," and network access gateway "NAG-2." In other words, the mobile node 115 powers up and becomes associated as listed above (block 542).

The first mobile node, MN-1, sends a packet to the second mobile node, MN-2, (block 544) and the packet is transmitted wirelessly to the AP-2, the AP of the first mobile node. Due to the dual-tier architecture, the AP "AP-2" sends the packet to the WG "WG-1" (block 546). For example, the sending of the packet from the AP "AP-2" to the WG "WG-1" can be accomplished via tunneling. The WG "WG-1" examines the packet based upon a decoding of the source address of the packet (the first mobile node, MN-1) forwards the packet to the anchor NAG of the first mobile node (NAG-1), if the NAG "NAG-1" is active (on-line) (block 548). The forwarding of the packet can be accomplished by creating an Ethernet frame and transmitting the Ethernet frame via the Ethernet switch 285 (FIG. 2c). If the anchor NAG, NAG-1, is inactive (offline), then the packet can be dropped. If a binding for the source address of the packet is not found, the packet can also be dropped.

When the packet arrives at the anchor NAG "NAG-1," the packet may undergo an optional authentication process, performed by the anchor NAG "NAG-1." The authentication process can involve the forwarding of the packet to an authentication server that will result in the first mobile node, MN-1, being securely connected to the authentication server and the authentication server verifying the status of the first mobile node, MN-1, and the account status of the subscriber using the first mobile node, MN-1. Once the first mobile node, MN-1, and its user have been authenticated, security features at the anchor NAG "NAG-1," such as a firewall, can be opened up for the first mobile node, MN-1.

The anchor NAG of the first mobile node, NAG-1, can then send the packet to the anchor NAG of the second mobile node, NAG-2 (block 550). When the anchor NAG of the second mobile node, NAG-2, receives the forwarded packet, the anchor NAG "NAG-2," can also optionally authenticate the packet. The anchor NAG for the second mobile node, NAG-2, can look in its stored information to determine a proper forwarding path for the packet to the second mobile unit, MN-2. Under normal operating conditions, the anchor NAG for the second mobile unit, NAG-2, already knows with which WC the second mobile node, MN-2 resides. This is due to when the WG-2 detected the presence of MN-2. If there is no forwarding path for the second mobile unit, MN-2, the anchor NAG "NAG-2" can broadcast an address resolution request through the Ethernet switch 285 to obtain the address of the WG that is currently serving MN-2. With the forwarding path, the anchor NAG "NAG-2" can send the packet to the WG "WG-2" (block 552). The packet can then be send to the AP "AP-1" (block 554) and subsequently arrives at the second mobile node, MN-2 (block 556).

Figure 5D:
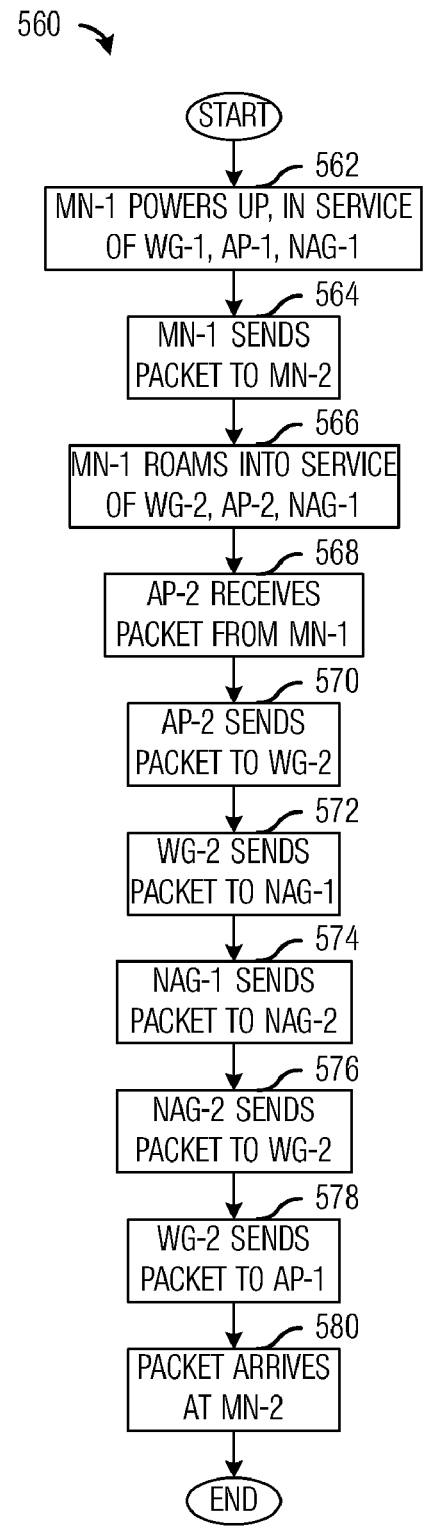

With reference now to FIG. 5d, there is shown a diagram illustrating a sequence of events 560 in a transmittal of a packet from a first mobile node (MN-1) to a second mobile node (MN-2), wherein the first mobile node, MN-1, roams into the operating area of a different WG after it initiates the transmission of the packet to the second mobile node, MN-2, according to a preferred embodiment of the present invention. For discussion purposes, let the first mobile node be associated with wireless gateway "WG-1," access point "AP-1," and network access gateway "NAG-1." Furthermore, let the second mobile node be associated with wireless gateway "WG-2," access point "AP-1," and network access gateway "NAG-2." In other words, the mobile node 115 powers up and becomes associated as listed above (block 562).

The first mobile node, MN-1, sends a packet to the second mobile node, MN-2, (block 564) and while the packet is transmitted wirelessly to the AP "AP-1," the first mobile node, MN-1, roams into a service area of the WG "WG-2" (block 566). As the first mobile node, MN-1, roams into the service area of the WG "WG-2," the packet (and any subsequent packets) can still be transmitted as long as a binding for the first mobile node, MN-1, is not removed at the WG "WG-1." As a result of the roaming, the first mobile node, MN-1, becomes associated with WG "WG-2," access point "AP-2," and network access gateway "NAG-1." Refer to the discussion of the sequence of events 520 shown in FIG. 5b for a detailed discussion of the sequence of events involved in roaming.

The AP "AP-2," the newly associated AP for the first mobile node, MN-1, receives a packet from the first mobile node, MN-1, (block 568) and sends the packet to WG "WG-2" (bock 570). The WG "WG-2" examines the source address of the packet based upon a decoding of the source address of the packet, forwards the packet to the anchor NAG of MN-1 "NAG-1" (block 572). The packet can be forwarded by creating an Ethernet frame and transmitting the Ethernet frame via the Ethernet switch 285. If the anchor NAG "NAG-1," is offline, the packet can be dropped. Furthermore, if a binding for the source address of the packet is not found, the packet can be dropped.

When the packet arrives at the anchor NAG "NAG-1," the packet may undergo an optional authentication process, performed by the anchor NAG "NAG-1." The authentication process can involve the forwarding of the packet to an authentication server that will result in the first mobile node, MN-1, being securely connected to the authentication server and the authentication server verifying the status of the first mobile node, MN-1, and the account status of the subscriber using the first mobile node, MN-1. Once the first mobile node, MN-1, and its user have been authenticated, security features at the anchor NAG "NAG-1," such as a firewall, can be opened up for the first mobile node, MN-1. The anchor NAG "NAG-1," can then pass the packet to the anchor NAG of the second mobile node, NAG-2 (block 574).

When the anchor NAG of the second mobile node, NAG-2, receives the forwarded packet, the anchor NAG "NAG-2," can also optionally authenticate the packet. The anchor NAG for the second mobile node, NAG-2, can look in its stored information to determine a proper forwarding path for the packet to the second mobile unit, MN-2. Under normal operating conditions, the anchor NAG for the second mobile unit, NAG-2, already knows with which WC the second mobile node, MN-2 is associated. This is due to when the WG-2 detected the presence of MN-2. If there is no forwarding path for the second mobile unit, MN-2, the anchor NAG "NAG-2" can broadcast an address resolution request through the Ethernet switch 285 to obtain the address of the WG that is currently serving MN-2. With the forwarding path, the anchor NAG "NAG-2" can send the packet to the WG "WG-2" (block 576). The packet can then be send to the AP "AP-1" (block 578) and subsequently arrives at the second mobile node, MN-2 (block 580).

Although the present invention and its advantages have been described in detail, it should be understood that various changes, substitutions and alterations can be made herein without departing from the spirit and scope of the invention as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A network comprising at least two wireless networks, said at least two wireless networks supporting roaming and comprising:

a wireless gateway comprising a plurality of wireless gateway circuits coupled to a plurality of wireless network access points to form a plurality of wireless clusters, a first one of said plurality of wireless gateway circuits and a first plurality of access points defining a first wireless cluster and a second one of said plurality of wireless gateway circuits and a second and different plurality of said access points defining a second wireless cluster, the wireless gateway configured to track the location of a plurality of mobile nodes in the wireless clusters, wherein first and second tracked mobile nodes of said plurality support only one of, respectively, first and second different networking architectures and/or topologies, and said wireless gateway is further configured to track said mobile nodes from a first access point in a wireless cluster to another access point in the wireless cluster, said first tracked mobile node communicating with access points in said wireless gateway according to said first networking architecture and/or topology and said second tracked mobile node communicating with access points in said wireless gateway according to said second networking architecture and/or topology;

a network access gateway coupled to a wired network, the network access gateway comprising first and second network access gateway circuits, said first network access gateway circuit only supporting said first networking architecture and/or topology and said second network access gateway circuit only supporting said second networking architecture and/or topology, and said network access gateway configured to be an anchor point for said plurality of mobile nodes in the wireless network, to maintain a fixed source of information about each mobile node in said wireless clusters as the mobile nodes roam from a wireless cluster to another wireless cluster, and to direct incoming and outgoing traffic to and from the mobile nodes; and a switch coupled to the wireless gateway and the network access gateway, the switch configured to provide connectivity between the network access gateway and the wireless gateway.

2. The network of claim 1, wherein each of the plurality of wireless networking access points supports a different networking architecture and/or topology.

3. The network of claim 1, wherein the at least two wireless networks are based on IEEE 802.11 compliant radio technology.

4. The network of claim 1, wherein the network includes at least one wireless gateway for each wireless network.

5. The network of claim 4, wherein a wireless gateway that is associated with a wireless cluster is responsible for tracking mobile nodes only within the wireless cluster associated with the wireless gateway.

6. The network of claim 1, wherein the network includes a plurality of network access gateways, each network access gateway configured to be an anchor point, maintain a fixed source of information, and direct traffic for a subset of mobile nodes.

7. The network of claim 6, wherein the network further includes a plurality of wireless gateways, and wherein a network access gateway remains associated with a mobile node even if the mobile node moves from a first wireless gateway to a second wireless gateway.

8. The network of claim 6, wherein a mobile node is assigned an Internet Protocol (IP) address upon association with the network, and wherein the mobile node is associated with a network access gateway based on the IP address.

9. The network of claim 8, wherein the mobile node maintains the assigned IP address for an entirety of time that it is associated with the network.

10. The network of claim 1, wherein the wireless gateway, the network access gateway, and the switch provide support for a predetermined number of mobile nodes, wherein additional wireless gateways, network access gateways, and switches are added to the network to support a number of mobile nodes, and wherein the number of mobile nodes is greater than the predetermined number of mobile nodes.

11. The network of claim 1, wherein a first device addressing technique is used to address packets flowing between the wireless gateway, the network access gateway and the switch and a second device addressing technique is used to address packets flowing between the wireless gateway and the mobile nodes, and wherein the first device addressing technique is different from the second device addressing technique.

12. The network of claim 1 wherein the first and second different networking architectures and/or topologies are proprietary networking architectures and/or topologies.

13. In a network comprising a wireless gateway including a plurality of wireless gateway circuits coupled to a plurality of wireless network access points to form a plurality of wireless clusters, a first one of said plurality of wireless gateway circuits and a first plurality of access points defining a first wireless cluster and a second one of said plurality of wireless gateway circuits and a second and different plurality of said access points defining a second wireless cluster, the wireless gateway configured to track the location of mobile nodes in the wireless clusters, wherein first and second tracked mobile nodes of said plurality support only one of, respectively, first and second different networking architectures and/or topologies, and said wireless gateway is further configured to track said mobile nodes from a first access point in a wireless cluster to another access point in the same wireless cluster, said first tracked mobile node communicating with access points in said wireless gateway according to said first networking architecture and/or topology and said second tracked mobile node communicating with access points in said wireless gateway according to said second networking architecture and/or topology, a method for communicating in the network, the method comprising:

establishing a session for a mobile node in the network, wherein information regarding a routing of packets to the mobile node is stored in a fixed location in the network, independent of a location of the mobile node; and permitting the mobile node to enter an operating mode.

14. The method of claim 13 further comprising, optionally authenticating the mobile node.

15. The method of claim 13, wherein the establishing comprises decoding an address for the mobile node to determine the fixed location.

16. The method of claim 15, wherein the fixed location is a network access gateway, and wherein the fixed location is used to store configuration information determined by an address of the mobile node.

17. The method of claim 13 further comprising after the permitting, updating the information at the fixed location if the mobile node has roamed to a different portion of the network.

18. The method of claim 17, wherein each wireless cluster of said plurality is associated with a wireless gateway, and wherein the updating comprises:

decoding an address for the mobile node to determine the fixed location; and providing configuration information of the mobile node to the fixed location.

19. The method of claim 13, wherein the fixed location is used to store configuration information determined by an address of the mobile node, and wherein the address of the mobile node remains constant as the mobile node roams about the network.

20. The method of claim 13 wherein the first and second different networking architectures and/or topologies are proprietary networking architectures and/or topologies.

* * * * *